(12) United States Patent
McNamara et al.

(10) Patent No.: US 10,858,202 B1
(45) Date of Patent: Dec. 8, 2020

(54) AIR CUSHIONED MATERIALS HANDLING SYSTEM

(71) Applicant: AMAZON TECHNOLOGIES, INC., Seattle, WA (US)

(72) Inventors: Alexander Michael McNamara, Seattle, WA (US); Thomas Meilandt Mathiesen, Seattle, WA (US); Korwin Jon Smith, Seattle, WA (US); Jason Michael Famularo, Seattle, WA (US); Sridhar Boyapati, Sammamish, WA (US); Amber Autrey Taylor, Seattle, WA (US); Félix Joseph Étienne Pageau, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 16/015,095

(22) Filed: Jun. 21, 2018

Related U.S. Application Data

(63) Continuation of application No. 14/252,598, filed on Apr. 14, 2014, now abandoned.

(51) Int. Cl.
    *B65G 51/03* (2006.01)
    *B65G 53/00* (2006.01)

(52) U.S. Cl.
    CPC .................... *B65G 53/00* (2013.01)

(58) Field of Classification Search
    CPC . B60V 1/00; B60V 1/06; B65G 51/03; B65G 54/00; B65G 54/02; B65G 2207/06
    USPC ...................... 406/88, 89; 414/676; 180/125; 104/23.2; 472/129; 700/230
    See application file for complete search history.

(56) References Cited

U.S. PATENT DOCUMENTS

| | | | |
|---|---|---|---|
| 3,094,223 A | | 6/1963 | Smith |
| 3,235,099 A | * | 2/1966 | Watters .................... B60V 3/04 414/676 |
| 3,251,595 A | | 5/1966 | Morgan et al. |
| 3,279,863 A | * | 10/1966 | Zuppiger ................. B60V 3/04 406/19 |
| 3,580,401 A | | 5/1971 | Stahl |
| 3,727,715 A | | 4/1973 | Barthalon |
| 3,734,231 A | | 5/1973 | De Vries |

(Continued)

OTHER PUBLICATIONS

Asthana, et al., "An Indoor Wireless System for Personalized Shopping Assistance", CiteSeerX, In Proceedings of IEEE Workshop on Mobile Computing Systems and Applications, 1994. Retrieved from the Internet: <URL:http://citeseerx.ist.psu.edu/viewdoc/summary?doi=10.1.1.127.3033>.

(Continued)

*Primary Examiner* — Joseph A Dillon, Jr.
(74) *Attorney, Agent, or Firm* — Lindauer Law, PLLC

(57) ABSTRACT

Described are systems for a materials handling facility to emit air from a floor which is used to generate an air cushion upon which one or more totes may move. The floor may contain one or more apertures which receive air from an air reservoir which is supplied by an air source such as a compressor. Air emitted by these apertures is constrained by a deck of the tote, forming an air cushion upon which the tote rests. In some implementations the air cushion may be maintained while a user is within a threshold distance, and discontinued when the user is beyond the threshold distance.

20 Claims, 8 Drawing Sheets

(56) References Cited

U.S. PATENT DOCUMENTS

| | | | |
|---|---|---|---|
| 3,825,094 A | 7/1974 | Burdick | |
| 3,827,364 A | 8/1974 | Maison | |
| 4,190,129 A * | 2/1980 | Mary | A63G 25/00 |
| | | | 180/119 |
| 4,193,470 A * | 3/1980 | Logan | B60V 1/14 |
| | | | 104/134 |
| 4,567,957 A * | 2/1986 | Johnson | B62D 55/062 |
| | | | 180/124 |
| 4,714,155 A * | 12/1987 | Watanabe | B65G 51/02 |
| | | | 104/23.2 |
| 4,815,926 A * | 3/1989 | Chaffee | B60V 3/025 |
| | | | 180/124 |
| 4,896,610 A * | 1/1990 | Denne | B65G 51/03 |
| | | | 104/23.2 |
| 5,065,464 A | 11/1991 | Blanchard et al. | |
| 5,248,236 A | 9/1993 | Ooshima et al. | |
| 5,287,676 A | 2/1994 | Erbse et al. | |
| 5,909,710 A | 6/1999 | Cummins | |
| 6,409,434 B1 * | 6/2002 | Winther | B65G 47/252 |
| | | | 406/15 |
| 6,574,530 B1 * | 6/2003 | Bertone | B66B 21/10 |
| | | | 198/321 |
| 6,626,612 B2 * | 9/2003 | Knapp | B65G 51/03 |
| | | | 406/19 |
| 7,108,123 B2 | 9/2006 | Zeidler et al. | |
| 7,225,980 B2 | 6/2007 | Ku et al. | |
| 7,326,025 B2 | 2/2008 | Viluan et al. | |
| 7,530,778 B2 | 5/2009 | Yassour et al. | |
| 7,908,995 B2 | 3/2011 | Inamasu et al. | |
| 7,949,568 B2 | 5/2011 | Fano et al. | |
| 8,009,864 B2 * | 8/2011 | Linaker | G06K 9/00664 |
| | | | 235/385 |
| 8,189,855 B2 * | 5/2012 | Opalach | G06Q 10/087 |
| | | | 382/100 |
| 8,210,955 B2 * | 7/2012 | Yule | A63G 21/18 |
| | | | 104/23.2 |
| 8,630,924 B2 * | 1/2014 | Groenevelt | G06Q 10/087 |
| | | | 211/90.01 |
| 8,863,872 B2 * | 10/2014 | Gorgas | A63G 25/00 |
| | | | 180/65.1 |
| 8,957,549 B2 * | 2/2015 | Kesler | H03H 7/40 |
| | | | 307/104 |
| 8,983,649 B2 * | 3/2015 | Checketts | G05D 1/0265 |
| | | | 700/213 |
| 9,235,928 B2 * | 1/2016 | Medioni | G06T 17/00 |
| 9,598,247 B2 * | 3/2017 | Zonenberg | B65G 51/03 |
| 9,656,814 B2 * | 5/2017 | Kraegeloh | A63F 3/00 |
| 9,889,995 B1 * | 2/2018 | Nishri | B65G 51/03 |
| 2002/0069785 A1 | 6/2002 | Knapp | |
| 2005/0259240 A1 | 11/2005 | Goren | |
| 2006/0054774 A1 * | 3/2006 | Yassour | B65G 51/03 |
| | | | 248/631 |
| 2006/0239808 A1 * | 10/2006 | Ludwig | B65G 47/24 |
| | | | 414/676 |
| 2007/0003400 A1 * | 1/2007 | Ikehata | B65G 49/063 |
| | | | 414/676 |
| 2007/0181735 A1 * | 8/2007 | Fedorov | B65G 51/03 |
| | | | 242/541.7 |
| 2007/0212174 A1 * | 9/2007 | Hayashi | B65G 47/22 |
| | | | 406/93 |
| 2007/0287119 A1 * | 12/2007 | Lyons | B65G 51/03 |
| | | | 432/242 |
| 2010/0217678 A1 | 8/2010 | Goncalves | |
| 2011/0011936 A1 | 1/2011 | Morandi et al. | |
| 2012/0284132 A1 | 11/2012 | Kim et al. | |
| 2013/0011234 A1 | 1/2013 | Pretlove et al. | |
| 2013/0284806 A1 | 10/2013 | Margalit | |
| 2014/0003871 A1 | 1/2014 | Inagaki | |
| 2014/0056654 A1 * | 2/2014 | Zonenberg | B65G 51/03 |
| | | | 406/88 |
| 2014/0161577 A1 | 6/2014 | Richman et al. | |
| 2014/0365258 A1 | 12/2014 | Vestal et al. | |
| 2015/0086107 A1 | 3/2015 | Dedeoglu et al. | |
| 2015/0209659 A1 | 7/2015 | Barr et al. | |

OTHER PUBLICATIONS

Dillon, Jr., Joseph A., "Notice of Allowance dated Mar. 22, 2018", U.S. Appl. No. 14/252,598, The United States Patent and Trademark Office, dated Mar. 22, 2018.

Dillon, Jr., Joseph A., "Advisory Action dated Sep. 21, 2016", U.S. Appl. No. 14/252,598, The United States Patent and Trademark Office, dated Sep. 21, 2016.

Dillon, Jr., Joseph A., "Final Office Action dated Jul. 14, 2016", U.S. Appl. No. 14/252,598, The United States Patent and Trademark Office, dated Jul. 14, 2016.

Dillon, Jr., Joseph A., "Non-Final Office Action dated Apr. 14, 2017", U.S. Appl. No. 14/252,598, The United States Patent and Trademark Office, dated Apr. 14, 2017.

Dillon, Jr., Joseph A., "Non-Final Office Action dated Feb. 19, 2016", U.S. Appl. No. 14/252,598, The United States Patent and Trademark Office, dated Feb. 19, 2016.

Dillon, Jr., Joseph A., "Restriction Requirement dated Nov. 17, 2016", U.S. Appl. No. 14/252,598, The United States Patent and Trademark Office, dated Nov. 17, 2016.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011,Beijing, China, Sep. 17-21, 2011.Retrieved from the Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

\* cited by examiner

AIR CUSHIONED MATERIALS HANDLING SYSTEM

PRIORITY

This application is a continuation of, and claims priority to, U.S. patent application Ser. No. 14/252,598 filed on Apr. 14, 2014, entitled "Air Cushioned Materials Handling System" which is hereby incorporated by reference in its entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It is often desirable to improve the ease with which items are moved within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
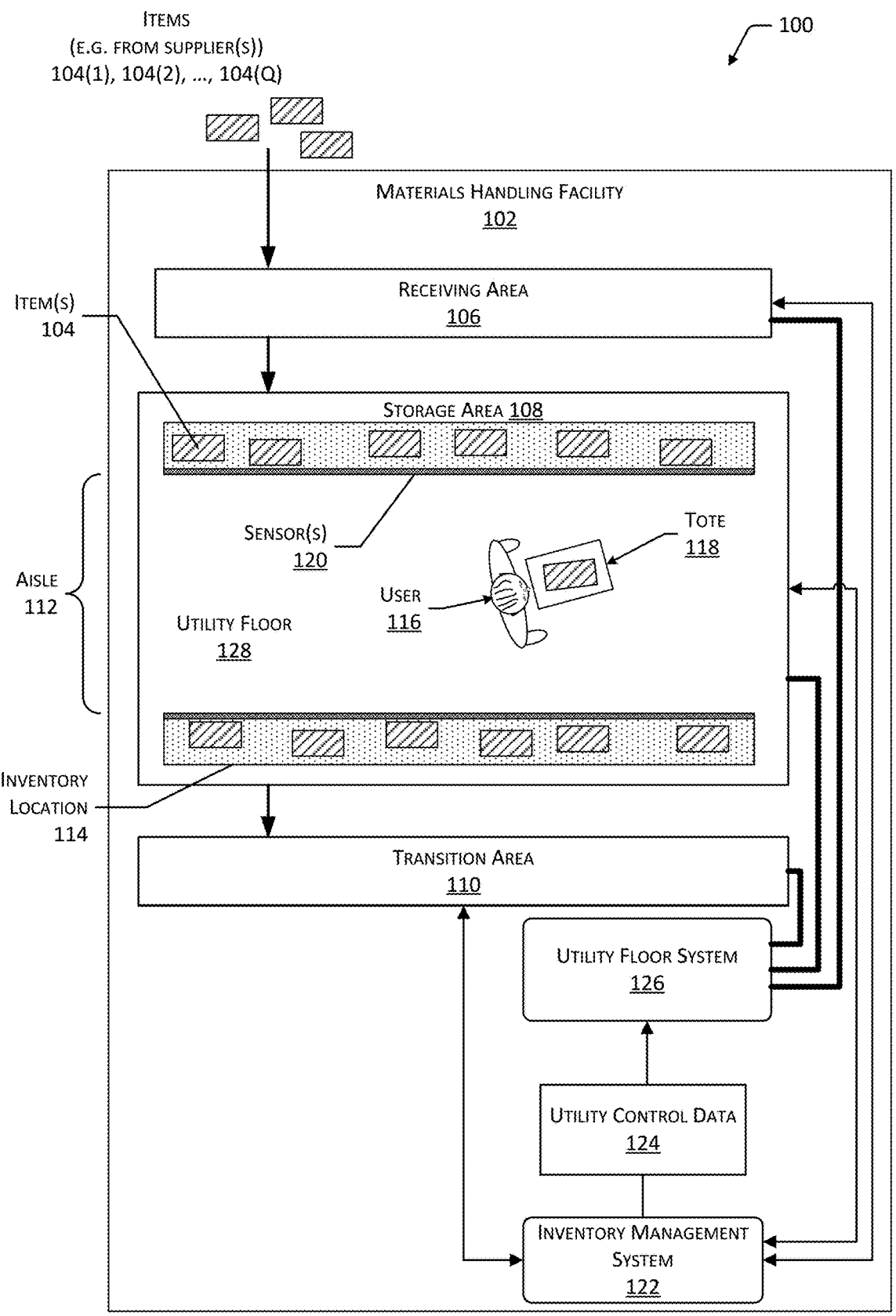
FIG. 1 is a block diagram illustrating a materials handling facility configured with a utility floor to support air-cushioned totes, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for providing notification output to a user of a materials handling facility (facility). The facility may include, or have access to, an inventory management system. The inventory management system may be configured to maintain information about items within the facility. For example, the inventory management system may maintain information indicative of quantities of items at various inventory locations, movement of items, and so forth. Movement of items may be facilitated by using material handling equipment, including but not limited to totes.

Traditional totes rely on wheels, roller bearings, or other similar mechanical devices to support the weight of the tote on a floor. These mechanical devices may result in a gap of three or more centimeters between the bottom of the tote and the floor. The mechanical devices may be prone to mechanical failure, such as a loss of lubricant, fouling from dirt, and so forth. As a result, the tote may be difficult or impossible for the user to manipulate.

The inventory management system may include one or more active electrical components within the tote which consume electrical power. For example, the tote may include a computing device with display, lights for providing notification output, heating or refrigeration equipment, and so forth. These active electrical components may receive electrical energy from a power source onboard the tote or from a wireless power unit. The wireless power unit is configured to send, receive, or send and receive power through magnetic induction, capacitive transfer, and so forth. By using the wireless power unit, the onboard power source may be reduced or eliminated entirely, power-intensive operations may be performed onboard the tote, and so forth.

Described in this disclosure are mechanisms and techniques for a tote which is supported at least in part during motion in the facility on an air cushion. A utility floor system emits air from a plurality of apertures in the floor and the tote is configured to float on a cushion of at least some of that air. The use of the air cushion significantly reduces the friction associated with movement, enabling the user to more easily move the tote.

The air cushion may also be configured to allow the tote to move more closely to the surface of the floor, compared to conventional wheels or bearings. When used in conjunction with wireless power units, the distance between a wireless power unit transmitter in or on the floor and a wireless power unit receiver in or on a deck of the tote is reduced. Wireless power transmission may be affected by an inverse square law associated with propagation of electromagnetic fields. By reducing the distance, power transfer may be improved.

In some implementations the utility floor system is configured to selectively direct a flow of air to particular sections of the floor. For example, the section of floor under the tote may emit air, while other sections of floor with no tote thereupon may be configured to not emit air.

The utility floor system may also be configurable to selectively establish and disestablish the air cushion supporting the tote responsive to conditions in the facility. For example, operation of the utility floor system may be controlled at least in part by the inventory management system. The inventory management system may be configured to use one or more sensors in the facility to determine when the user is proximate to the tote. Responsive to this proximity, the inventory management system may direct the utility floor system to maintain the air cushion, or disestablish the air cushion when the user moves away from the tote.

In one implementation, the establishment or disestablishment of the air cushion may occur by directing or stopping the flow of air to a particular floor section. For example, the flooring underneath the tote may be configured to emit air to establish the air cushion, and may be turned off to disestablish the air cushion.

In another implementation, the tote may be equipped with a spill mechanism configured to control the formation of the air cushion. For example, the spill mechanism may include a valve which controls an opening from the deck to the ambient atmosphere. The valve may be opened to vent at least a portion of the air received from the flooring such that the air cushion effect is no longer maintained. In another example, the spill mechanism may include a means to raise or open at least a portion of a skirt which is inflated at least partially by the air emitted from the floor, allowing additional air to escape and disestablishing the air cushion.

The utility floor system may be integrated with, or configured to operate in conjunction with, other systems. For example, environmental control devices such as furnaces, air conditioners, air cleaning units, and so forth may provide a portion of the air used by the utility floor.

Information about a weight of the tote, and the items placed therein, may be used by the inventory management system. The weight of the tote or of the items therein, may be determined based on the interaction between the floor and the tote while the air cushion is established. In one implementation pressure sensors in the flooring, the tote, or both may be configured to determine changes in pressure due to an increased load of weight on the tote. For example, as the tote is more heavily loaded, the distance between the deck and the floor decreases, impeding the flow of air and increasing a pressure in an air reservoir providing the air. The pressure in the air reservoir or at the deck of the tote within the air cushion may be used to determine the weight of the tote. In other configurations air velocity may be used instead of, or in addition to, the pressure to determine weight.

In another implementation, weight may be determined based on a distance between the tote and the utility floor. As described above, as the tote is more heavily loaded, the distance between the deck and the utility floor decreases. Given known characteristics of the utility floor and the air cushion, the decrease in the distance between the tote and the floor may be related to the weight of the tote. The distance may be measured using an infrared (IR) transmitter and receiver, capacitive detector, by way of a physical contact or "feeler" probe, and so forth.

The inventory management system may also be configured to determine the position of the tote. Using the position information of the tote, the inventory management system may energize particular wireless power unit transmitters and activate particular portions of the utility floor to emit air. As the tote moves through the facility, portions of the utility floor and particular wireless power units may be activated and deactivated.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein facilitate movement of items within the materials handling facility. By supporting the tote with an air cushion, surface friction is reduced and the user may more easily move heavy loads such as the tote carrying items. Additionally, power transfer may be enhanced because the air cushion reduces the distance between the wireless power units in the tote and the floor. As a result, additional power is available for consumption by onboard power-consuming devices, such as more power intensive computing devices, larger and brighter displays, and so forth. These aspects may improve the user experience of the facility which may, in turn, improve overall performance of the facility.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, pallets, tubs, or other suitable storage mechanisms configured to contain one or more items. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the facility 102 to another. The inventory location 114 may be moveable by way of the air emitted from the utility floor 128. In some implementations, the inventory locations 114 may include floor locations within the facility 102 or locations in an outside storage yard.

One or more users 116 and totes 118 or other materials handling apparatus may move within the facility 102. For example, the user 116 may move about within the facility 102 to pick or place the items 104 in various inventory locations 114, placing them on the tote 118 for ease of transport. In other implementations, other agencies such as robots, forklifts, cranes, aerial drones, and so forth, may move about the facility 102 picking, placing, or otherwise moving the items 104, the tote 118, and so forth. The tote 118 may be configured to move from one point in the facility 102 to another without the user 116 directly manipulating the tote 118. For example, the tote 118 may be configured to direct an air cushion (as described below), use one or more drive wheels coupled to a motor to move, and so forth.

One or more sensors 120 may be configured to acquire information in the facility 102. The sensors 120 may include, but are not limited to, imaging devices, weight sensors, pressure sensors, vibration sensors, radio frequency (RF) receivers, temperature sensors, humidity sensors, and so forth. The sensors 120 may be stationary or mobile, relative to the facility 102. For example, the inventory locations 114 may contain cameras configured to acquire images of pick or placement of items 104 on shelves. In another example, the floor of the facility 102 may include weight sensors configured to determine a weight of the user 116 or other object thereupon.

During operation of the facility 102, the sensors 120 may be configured to provide information suitable for tracking how the items 104 move within the facility 102. For example, a series of images acquired by a camera may indicate removal of an item 104 from a particular inventory location 114 and placement within the tote 118. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors, robots, material handling equipment, computing devices, and so forth in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked, or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item 104 picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The inventory management system 122 may be configured to determine a position of one or more objects in the facility 102, such as the inventory locations 114, the user 116, the tote 118, and so forth. The position may be determined using information acquired by one or more of the sensors 120. For example, image data acquired from one or more imaging sensors 120(1) may be used to find the position of the tote 118 and a particular aisle 112 next to a particular inventory location 114. In another example, radio frequency tags associated with the object may be interrogated, and based at least in part on received signal strength associated with signals from those tags, position in the facility 102 may be determined.

The inventory management system 122 may be configured to generate utility control data 124. The utility control data 124 may comprise instructions or commands suitable for controlling operation of the utility floor system 126 which provides one or more utilities at a utility floor 128. The utilities may include air, power, data, and so forth. In one implementation, the utility floor system 126 may be configured to emit air from a plurality of apertures in the utility floor 128. The tote 118 may be configured to be supported at least in part by an air cushion maintained by the emitted air. In another implementation, the utility floor system 126 may include a plurality of wireless power unit transmitters configured to transmit power to corresponding wireless power unit receivers in the tote 118. The utility floor system 126 is discussed in more detail below.

The inventory management system 122 may generate utility control data 124 to selectively activate one or more features of the utility floor system 126. For example, the utility control data 124 may be configured to activate the air handling system configured to emit the air from the utility floor 128. In another example, the utility control data 124 may comprise information indicative of a position within the facility 102, and a type of service to be provided at that position, such as providing air to support the tote 118.

Figure 2:
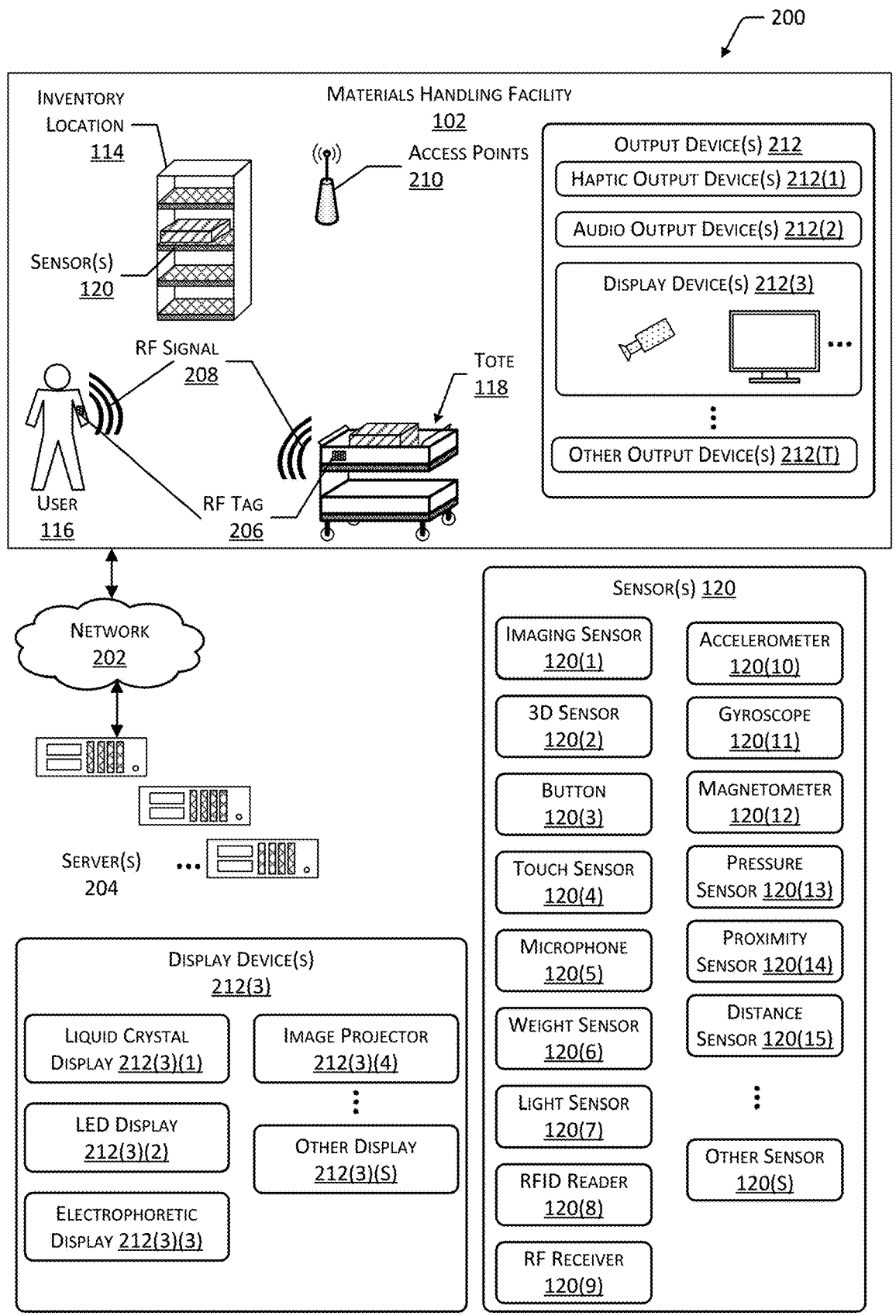
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 122 may be configured to use the RF tags 206 for one or more of identification of the object, determining a position of the object, and so forth. For example, the users 116 may wear RF tags 206, the totes 118 may have RF tags 206 affixed, and so forth which may be read and, based at least in part on signal strength, used to determine identity and position. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote 118, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth based at least in part on their appearance within the image data.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects, determine a position of an object, and so forth. For example, the inventory management system 122 may determine operational data such as position in the facility 102 of the user 116 based at least in part on the position in three-dimensional space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) which may be activated by the user 116. The inventory management system 122 may use the activation to activate at least a portion of the utility floor 128.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position of that change in electrical resistance within the material may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment. In some implementations arrays of microphones 120(5) may be used. These arrays may implement beam-forming techniques to provide for directionality of gain. The inventory management system 122 may use the one or more microphones 120(5) to acquire information from acoustic tags, accept voice input from the users 116, determine the position of one or more users 116 in the facility 102, determining ambient noise level, and so forth.

One or more weight sensors 120(6) are configured to measure the weight of a load, such as the item 104, the user 116, the tote 118, and so forth. The weight sensors 120(6) may be configured to measure the weights of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(6) to identify an object, determine a location of an object, maintain shipping records, and so forth.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of illumination on display devices in the facility 102.

One more radio frequency identification (RFID) readers 120(8), near field communication (NFC) systems, and so forth may also be provided in the sensors 120. For example the RFID readers 120(8) may be configured to read the RF tags 206. Information acquired by the RFID reader 120(8) may be used by the inventory management system 122 to identify an object associated with the RF tag 206 such as the item 104, the user 116 the tote 118, and so forth. For example, based on information from the RFID readers 120(8), a velocity of the RF tag 206 may be determined and used as kinematic data.

One or more RF receivers 120(9) may also be provided. In some implementations the RF receivers 120(9) may be part of transceiver assemblies. The RF receivers 120(9) may be configured to acquire RF signals 208 associated with Wi-Fi, Bluetooth, ZigBee, 3G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as the tote 118.

The sensors 120 may include one or more accelerometers 120(10), which may be worn or carried by the user 116, mounted to the tote 118, and so forth. The accelerometers 120(10) may provide information such as the direction and magnitude of an imposed acceleration. Operational data such as rate of acceleration, determination of changes in direction, speed, and so forth may be determined using the accelerometers 120(10).

A gyroscope 120(11) provides information indicative of rotation of an object affixed thereto. For example, the tote 118, or other objects may be equipped with a gyroscope 120(11) to provide operational data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) in the tote 118 may act as a compass and provide information indicative of which way the tote 118 is pointing.

A pressure sensor 120(13) is configured to generate a signal indicative of air pressure in a particular point. In one implementation, the pressure sensor 120(13) may generate pressure data relative to ambient air pressure, also known as gauge pressure. In another implementation, differential pressure between two points may be determined. The pressure sensor 120(13) may comprise a piezoresistive strain gauge, capacitive sensor, optical fiber to measure strain or deflection of the membrane, and so forth.

A proximity sensor 120(14) is configured to determine whether an object is proximate to the sensor 120. The proximity sensor 120(14) may use one or more optical, mechanical, acoustic, or electrical components to determine proximity. For example, an optical proximity sensor 120(14) may use an infrared transmitter an infrared receiver to determine if an object is within a detection range of the sensor 120. In another example, the proximity sensor 120 (14) may comprise the physical probe coupled to a switch which is activated upon contact with a proximate object. The proximity sensor 120(14) may be configured to provide proximity data which indicates a detected presence of an object.

A distance sensor 120(15) is configured to determine a distance to another object or surface. The distance sensor 120(15) may use one or more optical, mechanical, acoustic, or electrical components to determine proximity. For example, the distance sensor 120(15) may use an ultrasonic rangefinder employing sonar to determine a distance using time of flight of an acoustic signal. The distance sensor 120(15) may be configured to provide output indicative of centimeters or other linear measurement.

The sensors 120 may include other sensors 120(S) as well. For example the other sensors 120(S) may include thermometers, barometric sensors, hygrometers, or biometric input devices including but not limited to fingerprint readers or palm scanners.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the inventory management system 122, the sensors 120, the RF tag 206, a communication device of the tote 118, or other devices.

Output devices 212 may also be provided in the facility 102. The output devices 212 are configured to generate signals which may be perceived by the user 116.

Haptic output devices 212(1) are configured to provide a signal which results in a tactile sensation of the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetostrictive elements, or electrostatic elements, and so forth. For example, a piezoelectric buzzer or a speaker may be used to provide acoustic output.

The display devices 212(3) may be configured to provide output which may be seen by the user 116, or detected by a light-sensitive detector such as an imaging sensor 120(1) or light sensor 120(7). The output may be monochrome or color. The display devices 212(3) may be emissive, reflective, or both. An emissive display device 212(3) is configured to emit light during operation. For example, a light emitting diode (LED) is an emissive visual display device 212(3). In comparison, a reflective display device 212(3) relies on ambient light to present an image. For example, an electrophoretic display is a reflective display device 212(3). Backlights or front lights may be used to illuminate the reflective visual display device 212(3) to provide visibility of the information in conditions where the ambient light levels are low.

Mechanisms of the display devices 212(3) may include liquid crystal displays 212(3)(1), transparent organic light emitting diodes (LED) displays 212(3)(2), electrophoretic displays 212(3)(3), image projectors 212(3)(4), or other display mechanisms 212(3)(S). The other display mechanisms 212(3)(S) may include, but are not limited to, microelectromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(3) may be configured to present images. For example, the display devices 212(3) may comprise a pixel-addressable display. The image may comprise at least a two-dimensional array of pixels, or a vector representation of an at least two-dimensional image.

In some implementations, the display devices 212(3) may be configured to provide non-image data, such as text characters, colors, and so forth. For example, a segmented electrophoretic display, segmented LED, and so forth may be used to present information such as a SKU number. The display devices 212(3) may also be configurable to vary the color of the text, such as using multicolor LED segments.

In some implementations, display devices 212(3) may be configurable to provide image or non-image output. For example, an electrophoretic display 212(3)(3) with addressable pixels may be used to present images of text information, or all of the pixels may be set to a solid color to provide a colored panel.

The output devices 212 may include hardware processors, memory, and other elements. The elements of the output devices 212 may be configured to accept data indicative of the output to be presented and present that data to the user 116 haptically, audibly, visually, and so forth.

Other output devices 212(T) may also be present. For example, the other output devices 212(T) may include scent/odor dispensers, document printers, three-dimensional printers or fabrication equipment, and so forth.

Figure 3:
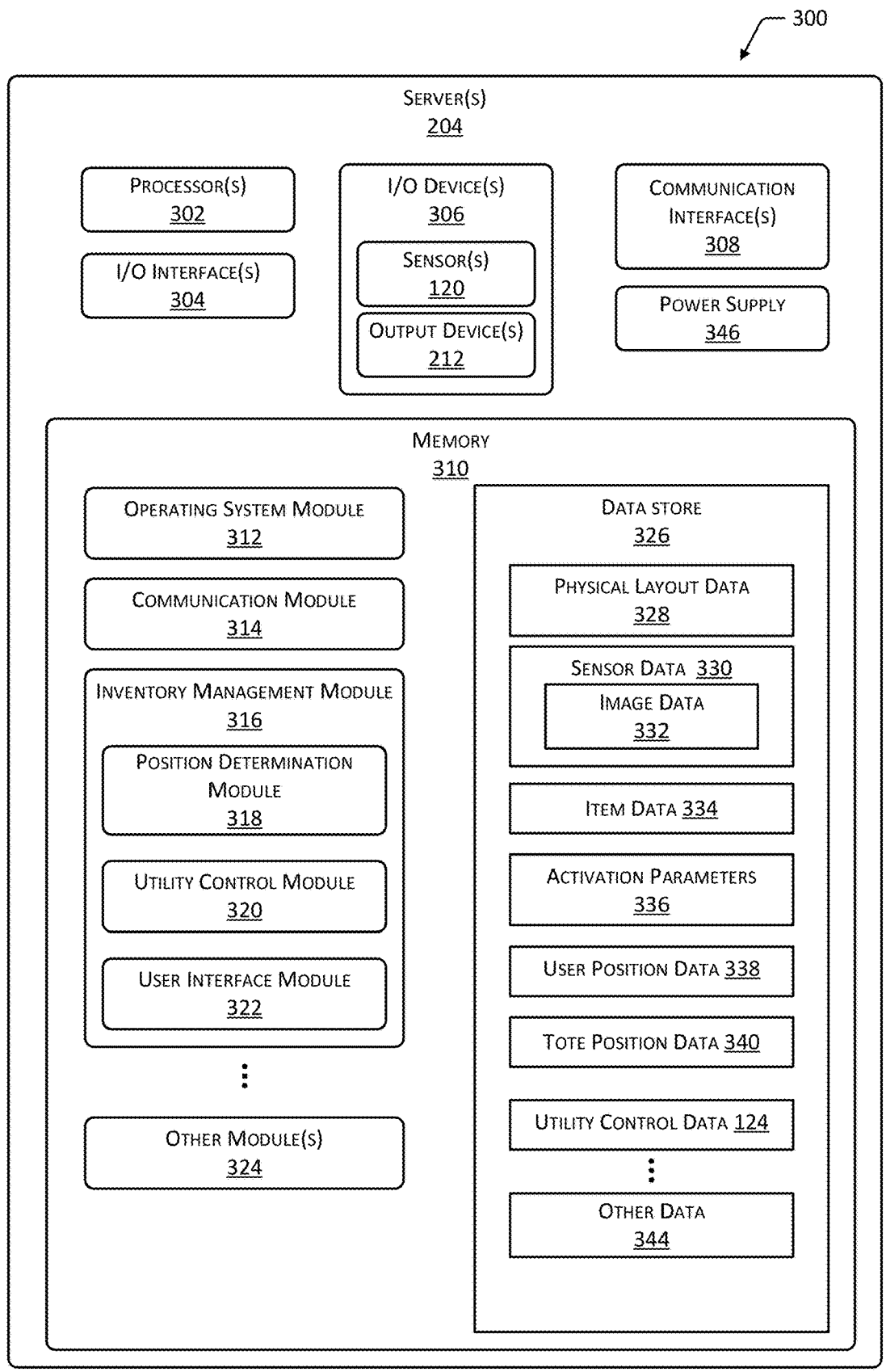
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interface(s) 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O device(s) 306 may include input devices such as one or more of a keyboard, mouse, scanner, the sensors 120, and so forth. The I/O device(s) 306 may also include output devices 212 such as one or more of a display, printer, audio speakers, and so forth. In some embodiments, the I/O device(s) 306 may be physically incorporated with the server 204 or may be externally placed.

The server 204 may also include one or more communication interfaces 308. The communication interfaces 308 are configured to provide communications between the server 204 and other devices, such as the sensors 120, the tote 118, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, the totes 118, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth.

The inventory management module 316 may include one or more of a position determination module 318, utility control module 320, or a user interface module 322.

The position determination module 318 is configured to determine a position of an object in the facility 102 based at least in part on sensor data from the one or more sensors 120. For example, the position determination module 318 may use image data to determine the positions of the users 116 and totes 118 within the facility 102. In one implementation, image data from the imaging sensors 120(1) may be processed to recognize the object and ascertain the position relative to other objects within the frame. For example, the facility 102 may include one or more visual indicia such as markings on the floor which may be used to determine the position of the object. In another implementation, point cloud data from a 3D sensor 120(2) may provide information indicative of a distance and position of the object with respect to the 3D sensor 120(2). Using a known position of the 3D sensor 120(2), the position of the object may be calculated.

The utility control module 320 is configured to generate the utility control data 124. The utility control module 320 may include one or more plug-ins configured to generate commands or instructions, which when processed by a controller associated with a particular utility are operative, to perform one or more functions. For example, the utility control module 320 may be configured to generate utility control data 124 indicating that the utility floor 128 is to emit air in aisle 112(1) to provide an air cushion to support the tote 118 and activate one or more wireless power units to provide power to the tote 118.

The user interface module 322 is configured to provide a user interface to the user 116. The user interface may accept input from one or more of the sensors 120, and provide output using one or more of the output devices 212.

Other modules 324 may also be present in the memory 310. For example, an object recognition module may be configured to use data from one or more of the sensors 120 to identify an object such as the item 104, the user 116, the tote 118, and so forth.

The memory 310 may also include a data store 326 to store information. The data store 326 may use a flat file, database, linked list, tree, executable code, script, or other data structure to store the information. In some implementations, the data store 326 or a portion of the data store 326 may be distributed across one or more other devices including other servers 204, network attached storage devices, and so forth.

The data store 326 may include physical layout data 328. The physical layout data 328 provides a mapping of physical positions within the facility 102 of devices and objects such as the sensors 120, inventory locations 114, and so forth. For example, the physical layout data 328 may indicate the coordinates within the facility 102 of an inventory location 114, an RFID reader 120(8) close to that inventory location 114, and so forth. In some implementations, the position determination module 318 may access the physical layout data 328 to determine a distance between two objects, such as the user 116 and the tote 118.

The data store 326 may also include sensor data 330. The sensor data 330 comprises information acquired from, or based on, the one or more sensors 120. For example, the sensor data 330 may comprise three-dimensional information about an object in the facility 102. As described above, the sensors 120 may include an imaging sensor 120(1) which is configured to acquire one or more images. These images may be stored as image data 332. The image data 332 may comprise information descriptive of a plurality of picture elements or pixels.

In some implementations, sensor data 330 from particular sensors 120 may be used for different purposes. The image data 332 may be processed and used instead of or in addition to the proximity sensor 120(14) to determine proximity of the user 116. For example, the proximity of the user 116 may be based at least in part on a relative size of the user's 116 image, or a portion thereof within an image frame. Continuing the example, the user 116 may be deemed to be proximate to an object such as the imaging sensor 120(1) when their entire face completely fills an image frame.

The item data 334 comprises information associated with the items 104. The information may include one or more inventory locations 114, at which one or more of the items 104 are stored. The item data 334 may also include order data, SKU or other product identifier, price, quantity on hand, weight, expiration date, images of the item, detail description information, ratings, ranking, and so forth. The inventory management module 316 may store information associated with inventory management functions in the item data 334.

The data store 326 may also store activation parameters 336. The activation parameters 336 may specify one or more thresholds or conditions under which particular utilities are to be provided. For example, the activation parameters 336 may include distance thresholds specifying that the utility floor 128 is to emit air when the user 116 is within 1 m of the tote 118. The activation parameters 336 may be based on distance, speed, time, and so forth. For example, the activation parameters 336 may specify that power transmission by a wireless power unit is to be discontinued after the tote 118 is unattended for more than a threshold number of minutes.

User position data 338 and the tote position data 340 may also be stored in the data store 326. The user position data 338 provides information indicative of a position of the user 116. The position may be absolute with respect to the facility 102, or relative to another object or point of reference. For example, the user position data 338 may indicate that the user 116 is 25.2 m along the aisle 112(1) and standing in front of the inventory location 114(47). In comparison, a relative position may indicate that the user 116 is 32 cm from the tote 118.

Similarly, the tote position data 340 provides information indicative of the position of the tote 118. The position may be absolute with respect to the facility 102, or relative to another object point of reference.

The user position data 338, the tote position data 340, or both, may be generated at least in part by the position determination module 318. The user position data 338, the tote position data 340, or both may be determined based on the sensor data 330. For example, the image data 332 acquired by the imaging sensors 120(1), signal strength data from the RFID readers 120(8) or the RF receivers 120(9), and so forth may be used to determine the positions.

The data store 326 may also store the utility control data 124. As described above, the utility control data 124 may comprise instructions or commands suitable for controlling operation of the utility floor system 126 which provides one or more utilities at the utility floor 128.

The data store 326 may store other data 344 as well, such as user preferences, configuration files, and so forth. For example, the data store 326 may store user data comprising information about one or more of the users 116 of the facility 102 such as demographic data, user preferences, user specific thresholds for activation of utilities, and so forth.

The server 204 may also include a power supply 346. The power supply 346 is configured to provide electrical power suitable for operating the components in the server 204.

Figure 4:
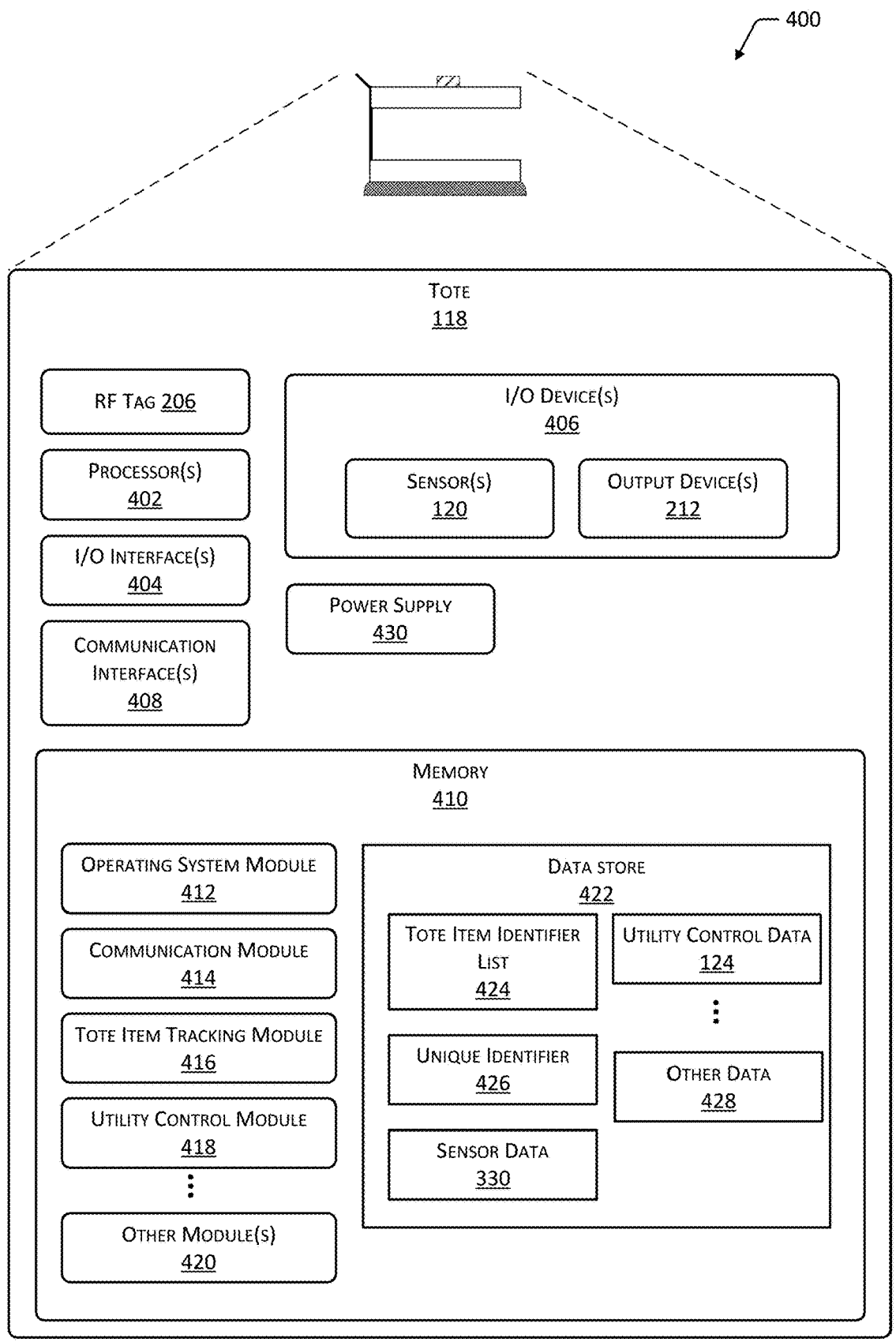
FIG. 4 is a block diagram of a tote configured to rest on an air cushion while being moved in the facility, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118. These indicia may be detected by the imaging sensors 120(1).

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interface(s) 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(6), RFID readers 120(8), pressure sensors 120(13), proximity sensors 120(14), distance sensors 120(15), and so forth. The I/O devices 406 may also include haptic output devices 212(1), audio output devices 212(2), display devices 212(3), and so forth. In some implementations input and output devices may be combined. For example, a touchscreen display may incorporate a touch sensor 120(4) and a display device 212(3). In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, routers, access points 210, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 412 may be used, such as the Windows operating system from Microsoft Corporation of Redmond, Wash., the LynxOS from LynuxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, other totes 118, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface on the display device 212(3) of the tote 118.

The memory 410 may include a utility control module 418. The utility control module 418 may be configured to control interaction of the tote 118 with one or more of the utilities provided by the utility floor 128. For example, the utility control module 418 may be configured to activate a spill mechanism which opens a valve configured to disestablish an air cushion of the tote 118. By disestablishing the air cushion, the tote 118 comes to rest on the utility floor 128. In another example, the utility control module 418 may be configured to send a signal or modify operation of the wireless power unit receiver onboard the tote 118, such that the wireless power unit transmitter of the utility floor 128 is activated to provide power to the tote 118.

The utility control module 418 may also be configured to generate utility control data 124. For example, the utility control module 418 may generate utility control data 124 configured to instruct the utility floor system 126 to activate wireless power units at a particular location. The utility control module 418 may be configured to send the utility control data 124 using the communication interface 408.

Similarly, the utility control module 418 may be configured to receive the utility control data 124 from the inventory management system 122 by way of the communication interface 408. For example, the inventory management system 122 may generate utility control data 124 configured to trigger the spill mechanism of the tote 118 to disestablish the air cushion.

In some implementations, the utility control module 418 may be configured to use sensor data 330 acquired from one or more sensors 120 onboard the tote 118. For example, the utility control module 418 may be further configured to establish or disestablish the air cushion responsive to information from the proximity sensor 120(14).

Other modules 420 may also be stored within the memory 410. In one implementation, a data handler module may be configured to generate operational data indicative of the user 116, the tote 118, or another one or more objects in range of the sensors 120 of the tote 118. For example, the data handler module may be configured to acquire data from one or more speed sensors 120 and provide that sensor data 330 to the operational data module of the server 204.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth interface.

The data store 422 may also store sensor data 330. The sensor data 330 may be acquired from the sensors 120 onboard the tote 118. The utility control data 124 received by the tote 118 may also be stored in the data store 422.

Other data 428 may also be stored within the data store 422. For example, tote configuration settings, user interface preferences, and so forth may also be stored.

The tote 118 may also include a power supply 430. The power supply 430 is configured to provide electrical power suitable for operating the components in the tote 118. The power supply 430 may comprise one or more of photovoltaic cells, batteries, wireless power unit receivers, fuel cells, capacitors, and so forth.

In one implementation the electronic devices onboard the tote 118 may be configured to operate on an intermittent basis, such as when stationary. For example, the tote 118 may be configured to receive power and operate the onboard electronic devices to perform tasks such as updating the user interface presented on an electrophoretic display 212(3)(3) of the tote, sending and receiving data, and so forth. By using a display such as the electrophoretic display 212(3)(3) which is capable of presenting an image even while power is removed, a user interface may remain presented to the user 116 even in the absence of power and operate the onboard electronic devices. Continuing the example, the communication interfaces 408 may operate by way of a near field communication system, direct physical contact with a conductor, or optical signaling system configured to function while the tote 118 is not in motion or moving very slowly. In this implementation, the tote 118 may have no onboard electrical power storage or production capacity.

Other mechanisms and apparatus associated with the tote 118 are described elsewhere in this disclosure. For example, the spill mechanism is described in more detail below with regard to FIG. 5.

Figure 5:
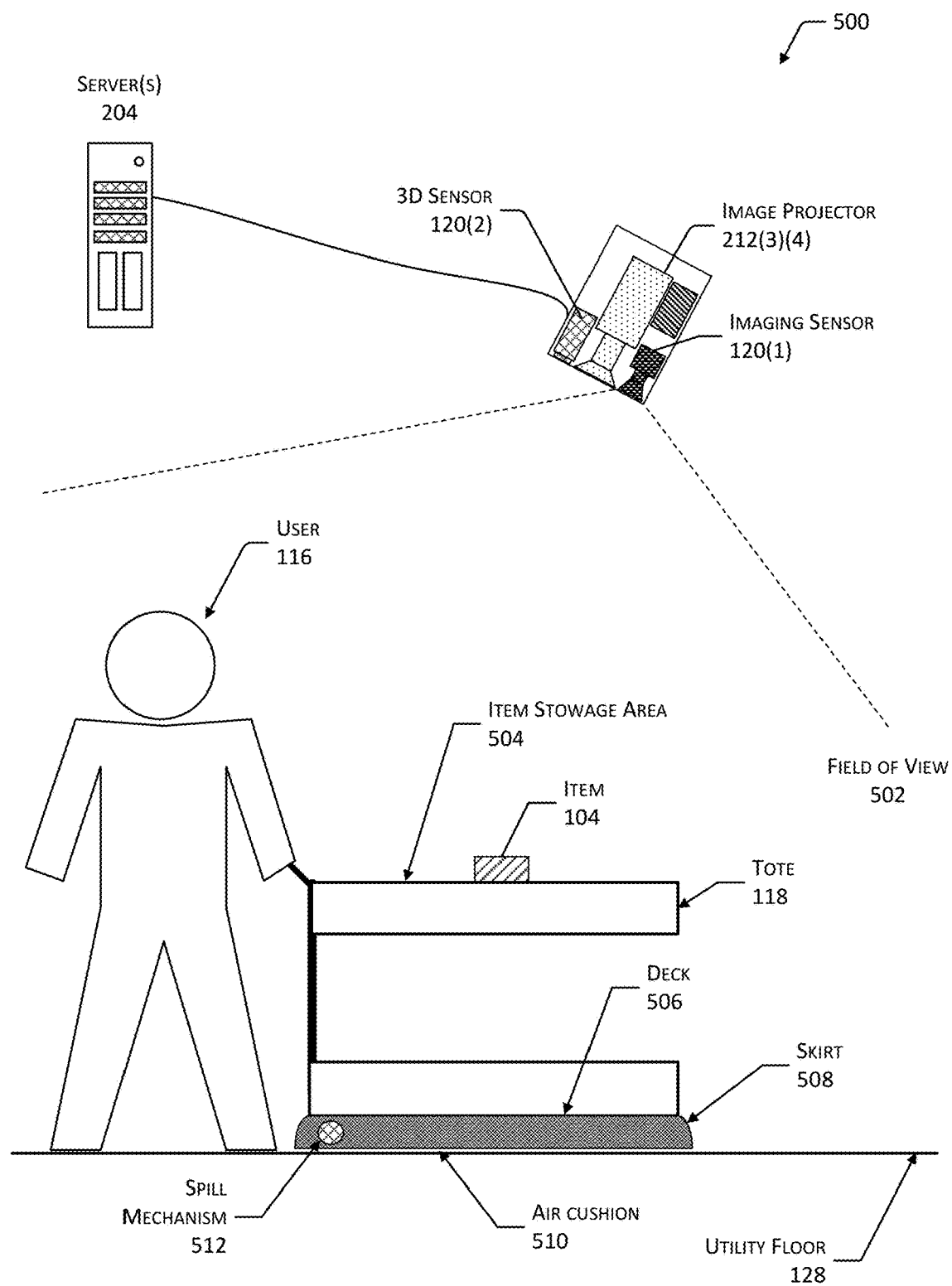
FIG. 5 illustrates a side view of the tote and sensors in the facility, according to some implementations.

FIG. 5 depicts a side view 500 of the tote 118 and sensors 120 in the facility 102, according to some implementations. One or more sensors 120 and output devices 212 may be arranged within the facility 102. In this illustration, an imaging sensor 120(1) is mounted overhead to acquire a view of at least a portion of the facility 102 and objects therein, such as the user 116 and the tote 118. The imaging sensor 120(1) has a field of view 502. The image data 332 from the imaging sensor 120(1) is representative of the scene within this field of view 502 at the time the image data 332 is acquired. In some implementations, additional devices such as a 3D sensor 120(2), an image projector 212(3)(4), and so forth may also be arranged overhead.

The facility 102 includes a utility floor system 126 having a utility floor 128. The utility floor system 126 is described in more detail below with regard to FIG. 6. The utility floor 128 is configured to provide physical support to the tote 118, the user 116, or other objects resting thereupon.

The tote 118 may include a frame or other structure. For example, the frame may comprise one or more of metal, plastic, ceramic, or composite materials. The frame may be substantially rigid sufficient to carry one or more items 104. In other implementations, the frame may be flexible. One or more handgrips may be coupled to or may be an extension of the frame. The handgrips provide a point at which the user 116 may move, grasp, and manipulate the tote 118.

The tote 118 is configured to provide one or more item stowage areas 504. For example, the frame may form the item stowage area 504. The item stowage areas 504 may include platforms, receptacles, cubbyholes, baskets, shelves, wells, or other features or apparatus to maintain one or more items 104 with the tote 118. The item storage area 504 is configured to contain one or more items 104 as loaded by the user 116, or another agency such as a robot or automated equipment.

The tote 118 may also include a deck 506 coupled to the frame. The deck 506 is configured to be supported by a portion of the air emitted from a flooring surface, such as the utility floor 128. The deck 506 may include one or more channels or surface features configured to direct air received from utility floor 128 across an underside of the deck 506. In some implementations, the deck 506 may have a skirt 508 affixed thereto. The skirt 508 may comprise a flexible material mounted to a perimeter of the deck 506 and configured to accept and retain a portion of the air emitted from the utility floor 128 to at least partially inflate the skirt 508. The flexible material of the skirt 508 may be formed into pleats or an accordion-fold. Once inflated, the skirt 508 may leak at least some air at the interface between the utility floor 128 and an edge of the skirt 508. The air emitted from utility floor 128 generates an air cushion 510 between the utility floor 128 and the deck 506 of the tote 118. In the implementations in which the tote 118 includes the skirt 508, such as depicted here, the flexible skirt 508 may provide for a measure of compliance to maintain the air cushion 510 as the tote 118 passes over irregularities in the utility floor 128. In some implementations the tote 118 may have a plurality of skirts 508 providing separate chambers with corresponding air cushions 510.

In some implementations the deck 506, the skirt 508, or both may be configured to bias the tote 118 towards motion and a particular direction, such as forward. For example, the deck 506 may exhibit a contoured surface such that additional air is expelled directionally from a back of the tote 118 pushing the tote 118 forward. In another implementation, the deck 506, the skirt 508, or both may be configured such that the back of the tote 118 is held at a slightly higher elevation than a front of the tote 118 relative to the utility floor 128, biasing the tote 118 towards forward motion.

In some implementations, the tote 118 may include a spill mechanism 512. The spill mechanism 512 may be mounted or configured to modify operation of the skirt 508, the deck 506, or a combination thereof. The spill mechanism 512 is configured to disestablish the air cushion 510 even as air is emitted from utility floor 128. For example, the spill mechanism 512 may include a valve configured to vent air from the skirt 508.

In another example, the spill mechanism 512 may include a means to raise or open at least a portion of the inflated skirt 508 at least partially. This raising or opening allows at least a portion of the air in the air cushion 510 to escape from between the deck 506 of the tote 118 and the utility floor 128, disestablishing the air cushion 510.

The spill mechanism 512 may be manually operated by the user 116, under electronic control of the inventory management system 122, under electronic control the control system onboard the tote 118, and so forth. For example, the spill mechanism 512 may comprise an electronically operated valve which controls airflow between an underside of the deck 506 which is proximate to the utility floor 128 and the ambient atmosphere. Upon opening the valve, the air cushion 510 is disestablished. When the valve is closed, the air cushion 510 is established as provided by the air emitted from utility floor 128.

In other implementations, other configurations of totes 118 may be used. For example, the tote 118 may comprise a single platform, may have more than two platforms, may be fully enclosed, and so forth. Some of the same structures and components may also be found in the inventory locations 114. For example, stationery shelving may be equipped with sensors 120, output devices 212, or both.

Figure 6:
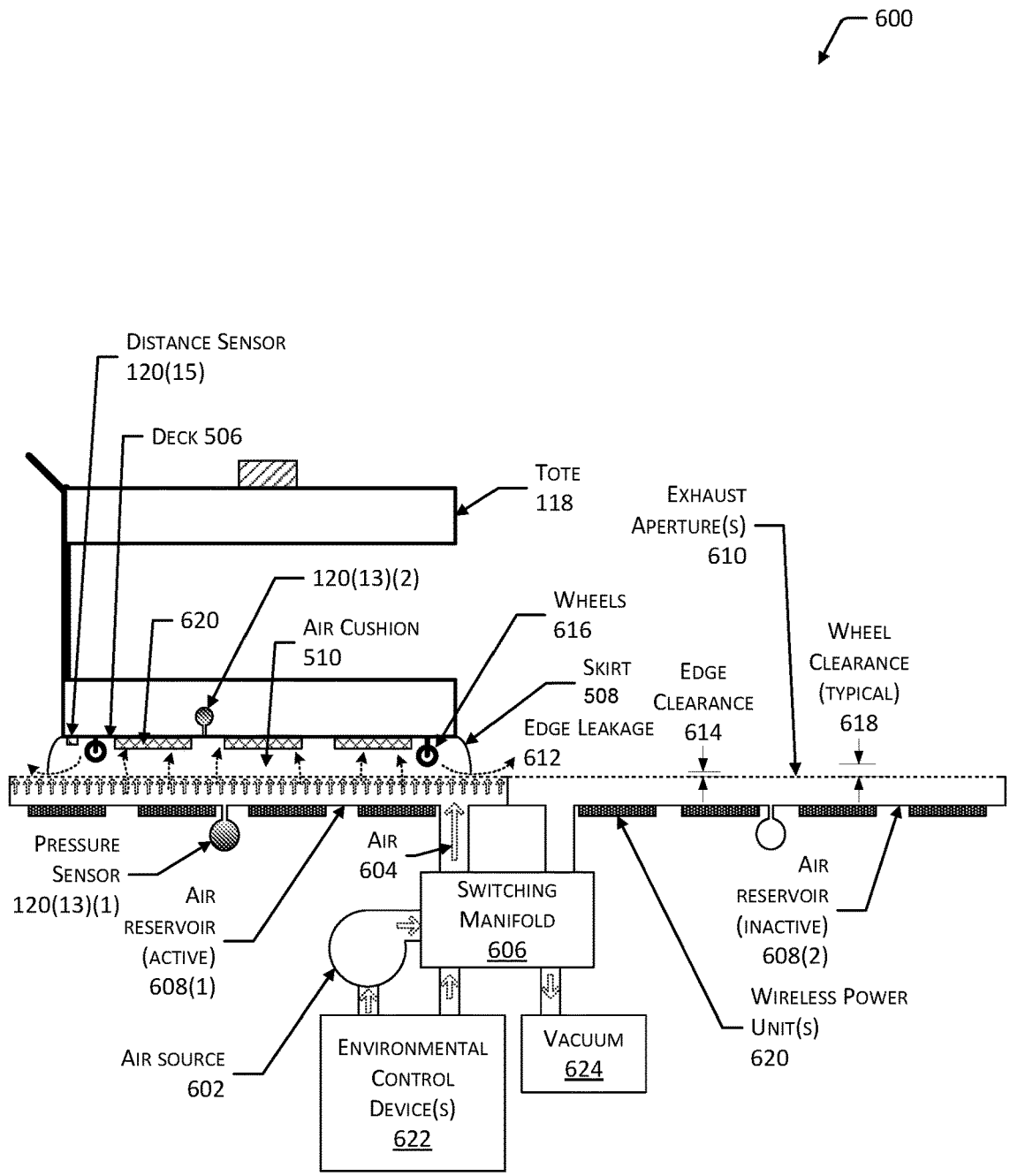
FIG. 6 is a schematic of the utility floor and the tote, according to some implementations.

FIG. 6 is a schematic 600 of the utility floor 128 and the tote 118, according to some implementations. The utility floor 128 may include several devices used to deliver various utilities such as air to maintain the air cushion 510 of the tote 118, power transmitted by one or more wireless power unit transmitters, and so forth. An air source 602 such as a compressor or blower is configured to provide a stream of air 604 to a switching manifold 606 which has a plurality of outlets. The air source 602 may employ one or more fans, pistons, helical screws, rotating vanes, or other mechanisms to provide the stream of air. An air source controller may comprise electronic controls configured to operate the air source 602 responsive to the utility control data 124.

The switching manifold 606 is configured to selectively direct at least a portion of the air 604 to one or more particular outlets to which one or more air reservoirs 608 or plenums are coupled. For example, each air reservoir 608 may be coupled to at least one outlet of the switching manifold 606. In some implementations, the air reservoirs 608 may comprise one or more channels or gas-porous interstices within a structure. For example, the air reservoirs 608 may comprise channels built into a floor tile. The air reservoirs 608 in turn, include or are coupled to one or more exhaust apertures 610. In some implementations a single exhaust aperture 610 may be associated with a single air reservoir 608. For example, the air reservoir 608 may comprise a pipe leading from the switching manifold 606 to the exhaust aperture 610. In other implementations, multiple exhaust apertures 610 may be associated with a single air reservoir 608. For example, the air reservoir 608 may comprise a pipe with branches connecting to the exhaust apertures 610, or the exhaust apertures 610 may be in a structure of the air reservoir 608, such as a hole drilled, formed, or punched into the material of the air reservoir 608. A switching manifold controller may comprise electronic controls configured to operate the switching manifold 606 responsive to the utility control data 124. The switching manifold controller may be configured to independently address or direct the flow of air amongst the air reservoirs 608. For example, the flow of air may be selectively directed to one air reservoir 608 and not another.

The exhaust aperture(s) 610 may comprise holes, slits, nozzles, pores, mesh and so forth which provide a pathway for the air 604 to move from the air reservoir 608 to or at a surface of the utility floor 128. For example, each air reservoir 608 may be coupled to one or more exhaust apertures 610. The exhaust apertures 610 may be configured to direct air 604 at one or more angles relative to a surface of the utility floor 128. For example, the exhaust apertures 610 on a right side of the aisle 112 may be configured to emit the air 604 in a jet at an angle of 80° relative to the utility floor 128, with the jets emitting air 604 along a designated direction of travel for that side of the aisle 112. The air 604 which is under pressure within the air reservoir 608 thus escapes the air reservoir 608 through the exhaust apertures 610. The air 604 which is exhausted at the surface of the utility floor 128 may be used to provide the air cushion 510 between the tote 118 and utility floor 128.

In this illustration, a first air reservoir 608(1) is configured such that the switching manifold 606 is directing the air 604 from the air source 602 to the air reservoir 608(1) which is beneath the tote 118. For example, the utility control module 320 generates utility control data 124 which is processed by the switching manifold controller to adjust valves within the switching manifold 606 such as that the air 604 is routed to the desired air reservoir 608(1).

In some implementations, the switching manifold 606 may be omitted. For example, the air source 602 may provide air 604 continuously to all coupled air reservoirs 608. In another example, each air reservoir 608 may have its own air source 602 attached.

The tote 118 may be unable to maintain a complete seal between the deck 506 and the surface of the utility floor 128 or the edge of the skirt 508 and the surface of the utility floor 128. As a result, there may be some edge leakage 612 of air which escapes from between the deck 506 and the surface of the utility floor 128. The edge leakage 612 may provide a fluid lubrication at the interface between the deck 506 (or the skirt 508) and the surface of the utility floor 128. During operation, while the air cushion 510 is established, an edge clearance 614 may exist between the deck 506 and the utility floor 128 surface.

One or more of the components in the utility floor 128 may be under computer control. For example, the air source 602 may be computer controlled to turn on, off, or provide different flow rates of air 604. In another example, the switching manifold 606 may be under computer control such that the inventory management system 122 may selectively direct air 604 to different air reservoirs 608.

In some implementations, one or more pressure sensors 120(13) may be used. The pressure sensors 120(13) may be configured to measure pressure within various portions of the system, such as within the air reservoir 608, in the air cushion 510, and so forth. For example the pressure sensor 120(13) may be mounted onboard the tote 118 and configured to measure the pressure of the air cushion 510 which exists between the deck 506 and the surface of the utility floor 128. Continuing the example, the pressure measurement may be of the volume bounded at least in part by the deck 506, the skirt 508, and the surface of the utility floor 128.

Data from the pressure sensors 120(13) may be used to determine a weight of the tote 118 or of the items therein based on the interaction between the utility floor 128 and the tote 118 while the air cushion 510 is established. As the weight of the tote 118 increases, the air pressure in the air cushion 510, the air reservoir 608, or both may increase. For example, as the tote 118 is more heavily loaded, the distance between the deck 506 and the utility floor 128 decreases, impeding the flow of air 604 and increasing a pressure in an air reservoir 608 providing the air 604.

By measuring pressure changes the inventory management system 122 may determine the weight of the tote 118. For example, a pressure sensor 120(13) coupled to the air reservoir 608(1) may provide pressure data on the air 604 within the air reservoir 608(1). A processing device, such as the server 204, may be configured to generate a weight of the tote 118 using the pressure data. For example, a lookup table comprising a set of pressures and corresponding weights may be accessed and used to provide the weight. In some implementations the pressure data may be used to determine a change in weight, indicative of an increase or a decrease in the tote 118 weight, but not necessarily specific as to a quantity of weight added to or removed from the tote 118.

In other configurations, velocity of the air 604 may be used instead of, or in addition to, the pressure to determine weight. For example, a decrease in the clearance between the deck 506 and the utility floor 128 may result in increased velocity of the air 604 migrating from a center of the deck 506 to an edge of the deck 506.

In another implementation, weight may be determined based on a distance between the tote 118 and the utility floor 128. As described above, as the tote 118 is more heavily loaded, the distance between the deck 506 and the utility floor 128 decreases. Given known characteristics of the utility floor 128 and the air cushion 510, the decrease in the distance between the tote and the floor may be related to the weight of the tote. The distance may be measured using an infrared transmitter and receiver, capacitive sensor, by way of a physical contact or "feeler" probe, and so forth. For example, the "feeler" probe may contain a member which is configured to mechanically rest upon the utility floor surface and provide an indication of the distance.

In some implementations the tote 118 may have one or more wheels 616, feet, or other structures configured to support the weight of the tote 118 when the air cushion 510 is disestablished. The wheels 616 may be configured to disengage a surface of the utility floor 128 while the tote 118 is supported by the air cushion 510 resulting from the air 604 emitted from the utility floor 128. While disengaged, the wheels 616 may exhibit a wheel clearance 618 or gap between the bottom of the wheels 616 and the surface of the utility floor 128. In one implementation, the wheel 616 may also provide support in the event the tote 118 is loaded with the items 104 whose combined weight exceeds the carrying capacity of the air cushion 510. In this implementation, the weight of the tote 118 may be supported at least in part by the wheels 616 as well as the air cushion 510.

As described above, the utility floor 128 may include one or more wireless power units 620. The wireless power unit 620 is configured to transfer power from one point to another without the use of conductors. Wireless power transfer may include inductive coupling, capacitive coupling, electromagnetic transfer, and so forth. For example, resonant inductive coupling may be used to transfer power from a coil in or on the utility floor 128 to a corresponding coil in or on the tote 118. Electromagnetic transfer includes the use of photovoltaic cells accepting light with wavelengths ranging from infrared to ultraviolet. For example, lighting fixtures in the utility floor 128 may be configured to provide infrared light to which corresponding photovoltaic cells may produce electrical current. Electromagnetic transfer may also include power transfer using microwave wavelengths, or other wavelengths. Electromagnetic transfer may also include resonant inductive coupling which uses a magnetic field to transfer energy. The wireless power units 620 may be included within, under, or above the air reservoir 608. For example, as depicted in FIG. 6 the wireless power units 620 are under the air reservoir 608.

One or more wireless power units 620 may also be deployed onboard the tote 118. The wireless power unit 620 onboard the tote 118 may electromagnetically couple to the wireless power unit 620 in the utility floor 128. Once coupled, energy may be transferred from the utility floor 128 to the tote 118, which may use the power and operate one or more electronic devices onboard the tote 118 or coupled thereto.

The utility floor system 126 may be integrated with, or configured to operate in conjunction with, other systems. As illustrated here, environmental control devices 622 associated with heating, ventilation, and air-conditioning may be used to provide at least a portion of the input air 604 to the air source 602. The environmental control devices 622 may include air heating units such as furnaces, air cooling units such as air conditioners, air cleaning units, humidifiers, dehumidifiers, and so forth. For example, the switching manifold 606 and the air reservoirs 608 may be used to distribute air 604 for heating and cooling purposes. In some implementations, the exhaust aperture 610 and the air reservoirs 608 may be used to provide return air 604 to the environmental control devices 622.

The utility floor system 126 may also include a vacuum 624 device. The vacuum 624 may be configured to withdraw a stream of air 604 or otherwise evacuate at least a portion of the air 604 from one or more of the air reservoirs 608. As illustrated here, in some implementations the vacuum 624 may be coupled to the air reservoirs 608 by way of switching manifold 606. The vacuum 624 may be employed to create an area of low pressure in the one or more of the exhaust apertures 610 associated with an air reservoir 608 coupled to the vacuum 624. This area of low pressure may act upon the underside of the tote 118 such as the deck 506 to maintain the tote 118 in a particular position. For example, the user 116 may direct the inventory management system 122 to lock the tote 118 in place while loading an item. Responsive to this direction, the inventory management system 122 may generate utility control data 124 which directs a switching manifold 606 to disconnect the air reservoir 608 which supplies the exhaust apertures 610 beneath the tote 118. A switching manifold controller may act upon this utility control data 124 to decouple the air reservoir 608 from the air source 602 and couple the air reservoir 608 to the vacuum 624. The vacuum 624 applies a low pressure to the air reservoir 608 which in turn provides a low pressure at the interface between the utility floor 128 and the tote 118. This low pressure may increase the pressure exhibited between the tote 118 and the surface of the utility floor 128, increasing friction between the two and limiting the movement of the tote 118 with respect to the utility floor 128.

In other implementations, the vacuum 624 may be used to remove debris from the utility floor 128. For example, the vacuum 624 may be used to remove dust from the surface of utility floor 128.

Figure 7:
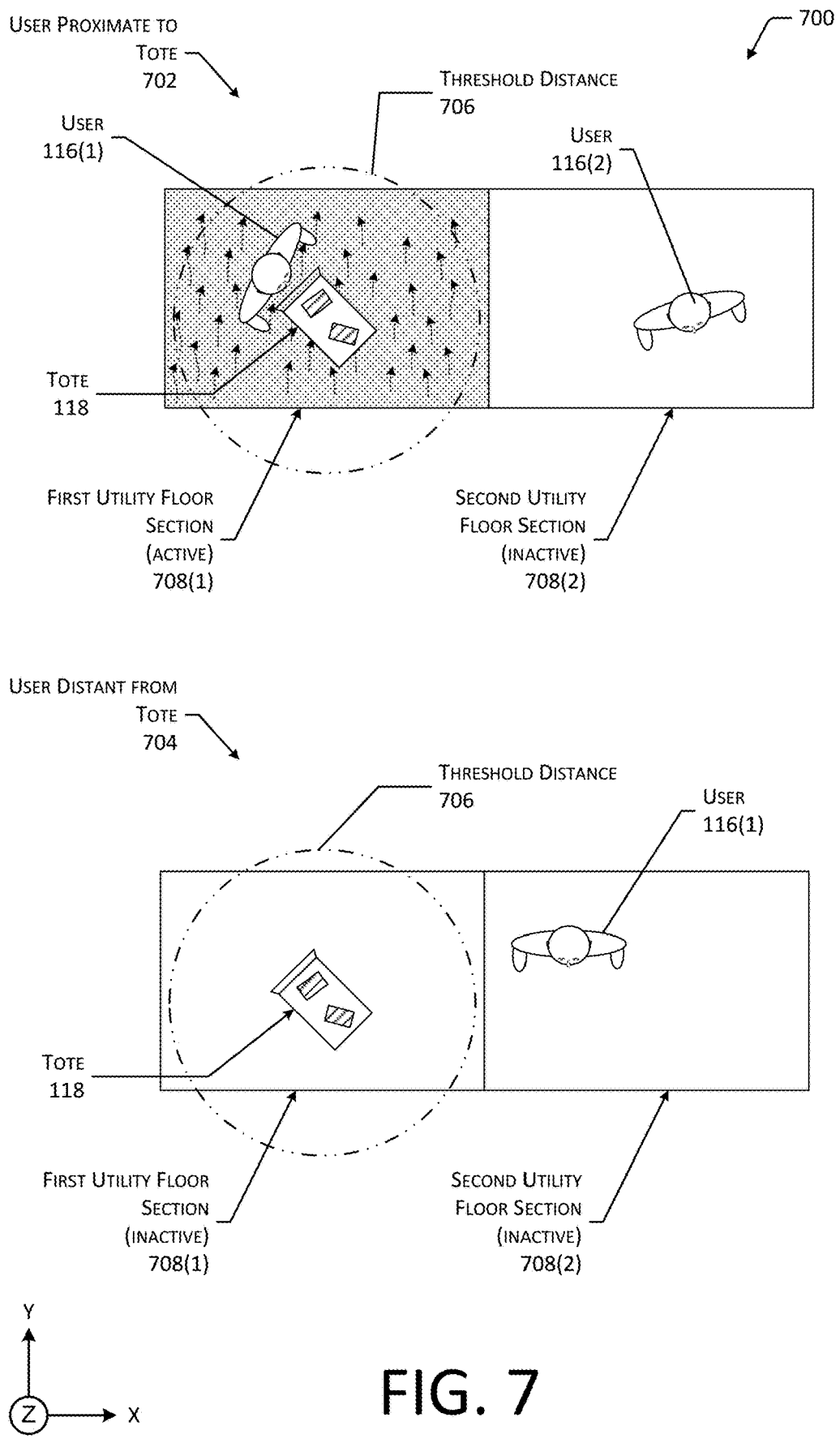
FIG. 7 illustrates a scenario in which selected portions of the utility floor which are occupied by the tote are activated based on proximity of the user to the tote, according to some implementations.

FIG. 7 illustrates a scenario 700 in which selected portions of the utility floor 128 which are occupied by the tote 118 are activated based on proximity of the user 116 to the tote 118, according to some implementations. During operation of the facility 102, the user 116 may step away from the tote 118. For example, the user 116 may walk down the aisle 112 to retrieve a particular item 104, leaving the tote 118 behind.

As described above, the inventory management system 122 may be configured to activate portions of the utility floor 128 which are proximate to the tote 118. In the scenario depicted here, activation may also be responsive to an interaction between the user 116 and the tote 118.

A first scenario 702 depicts the user 116(1) proximate to the tote 118, while a second scenario 704 depicts the user 116(1) distant from the tote 118. In the first scenario 702, the user 116(1) is standing behind the tote 118, such as in the position where the user 116(1) is grasping the handles of the tote 118. The user 116(1) is within a threshold distance 706 of the tote 118. The threshold distance 706 may be static or dynamically set. For example, the threshold distance 706 may vary based at least in part on a count of other totes 118 in the aisle 112, such that the threshold distance 706 is 1 m while the aisle 112 is crowded, and 3 m while the aisle 112 is empty.

One or more of the sensors 120 may determine the position or presence of the user 116, which may then be compared with the threshold distance 706. For example, the tote 118 may include an onboard proximity sensor 120(14) configured to determine the presence of the user 116 adjacent to the handle. In another example, the handle may include one or more buttons 120(3) or touch sensors 120(4) configured to generate a signal when the user 116 is holding the handle. The position determination module 318 may use information from these sensors 120 to determine whether the user 116 is within the threshold distance 706. When the user 116 is within the threshold distance 706 of the tote 118, the utility control module 320 may activate a section of the utility floor 708 which is under the tote 118, providing the air cushion 510. Other utilities such as data, power, and so forth may also be provided.

As depicted in the first scenario 702, the user 116(1) is within the threshold distance 706 or otherwise determined to be proximate to the tote 118. Responsive to this, the utility control module 320 generates utility control data 124 to activate the utility floor system 126 to provide air 604 to the first utility floor section 708(1). In comparison, a second utility floor section 708(2) which is occupied by the user 116(2) and unoccupied by a tote 118 remains inactive.

As depicted in the second scenario 704 in which the user 116(1) is distant from the tote 118, the first utility floor section 708(1) is now inactivate, responsive to the user 116(1) being beyond the threshold distance 706. For example, the position determination module 318 may determine the user position data 338 and the tote position data 340. Continuing the example, the position determination module 318 may calculate a distance between the user 116(1) and the tote 118, and compare with the threshold distance 706 to determine the user 116(1) is beyond the threshold distance 706. Responsive to this, the utility control module 320 generates utility control data 124 to deactivate the utility floor system 126 or portion thereof which supplies the first utility floor section 708(1). As the user 116(1) returns to the tote 118, the utility control module 320 may reactivate the utilities of first utility floor section 708(1).

In some implementations the threshold distance 706 may be specific to a particular combination of user 116 and tote 118. For example, the user 116(1) may be assigned a particular tote 118(1) upon entry to the facility 102. The utility control module 320 may be configured to activate the utility floor 128 when the particular user 116(1) is proximate to the tote 118(1), and not another user 116(2).

Illustrative Processes

Figure 8:
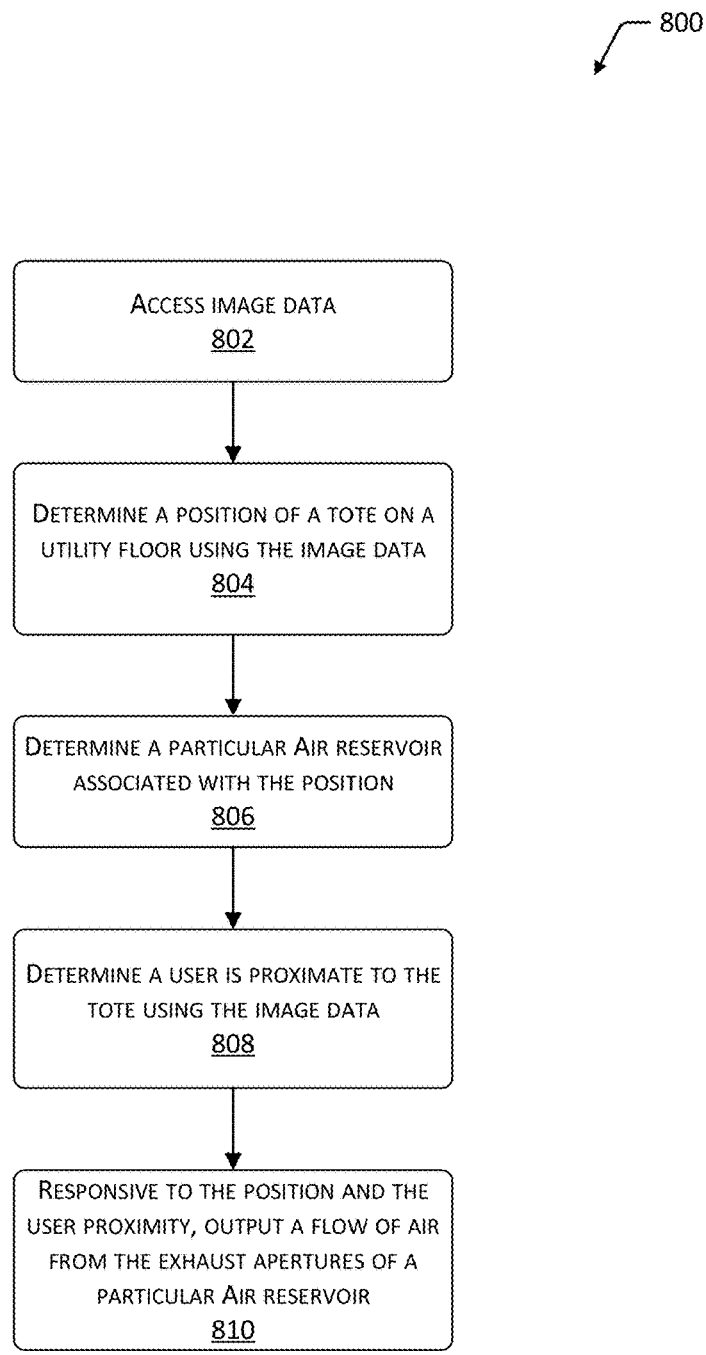
FIG. 8 depicts a flow diagram of a process for controlling the air cushion of the tote, according to some implementations.

FIG. 8 depicts a flow diagram 800 of a process for controlling the air cushion 510 of the tote 118, according to some implementations. The process may be performed at least in part by the utility control module 320 at the server 204, by the utility control module 418 onboard the tote 118, or both.

Block 802 accesses image data 332. One or more of the imaging sensors 120(1) in the facility 102 may have acquired the image data 332. For example, the image data 332 may be stored in the memory 310 and retrieved therefrom.

Block 804 uses the image data 332 to determine tote position data 340 indicative of a position of the tote 118 on the utility floor 128. For example, object recognition may be used to identify a particular object, an image data 332 from a plurality of imaging sensors 120(1) may be used to provide stereo vision and locate the object within a three-dimensional space. In other implementations, other techniques discussed in this disclosure or otherwise known may be used.

Block 806 determines a particular air reservoir 608 associated with the position of the tote 118 on the utility floor 128. For example, based at least in part on the tote position data 340, the physical layout data 328 may be accessed and information indicative of the air reservoir 608 which services that position may be retrieved.

Block 808 uses the image data 332 to determine the user 116 is proximate to the tote 118. For example, the determination may comprise recognizing the user 116 and the tote 118, and determining that they are within a particular number of pixels of one another within the image data 332. In some implementations the determination of the proximity to the tote 118 may be any user 116, while in other implementations the determination may be specific to the identity of a particular user 116.

Responsive to the tote position data 340, the proximity of the user 116, or both, block 810 operates the switching manifold to direct a flow of air to the one or more outlets corresponding to the particular air reservoir 608. For example, the utility control module 320 or 418 may issue utility control data 124 configured to direct the switching manifold 606 to output a flow of air 604 to a particular air reservoir 608 which in turn exhausts at least a portion of the air 604 from the exhaust aperture 610 coupled thereto. The activation parameters 336 may specify the conditions under which a particular utility is to be delivered, a duration for which the utilities are to be provided, and so forth. In this example, the activation parameters 336 may specify that air 604 is to be supplied to the portion of the utility floor 128 which is underneath the tote 118, but only when the user 116 is within a predetermined distance threshold. Continuing the example, the activation parameters 336 as described may thus prevent the air cushion 510 from being established at unattended totes 118.

In another implementation, responsive to the tote position data 340, the proximity of the user 116, or both, the utility control module 320 or 418 may generate utility control data 124 configured to direct the spill mechanism 512 onboard the tote 118 to establish or disestablish the air cushion 510. For example, the utility floor 128 may be configured to continuously provide air 604 and the inventory management system 122 may be configured to trigger the spill mechanism 512 to disestablish the air cushion 510 under the tote 118 after the user 116 walks away. In another example, the spill mechanism 512 may be used to maintain the air cushion 510 responsive to a determination the user 116 is proximate to the tote 118, and discontinue the air cushion 510 responsive to a determination that the user 116 is not proximate. As described above, proximity may be based at least in part on the user 116 being within a threshold distance 706, being detected by a proximity sensor 120(14), being present at a particular place within an image acquired by an imaging sensor 120(1), and so forth.

In yet another implementation, activation of the portion of the utility floor 128 may be responsive to a direction of travel of the tote 118. The position determination module 318 may be configured to determine movement of the tote 118 along the utility floor 128. For example, based on a time series of positions, speed and direction of travel of the tote 118 may be determined. Based on the direction of travel, the utility control module 320 may generate utility control data 124 configured to direct the switching manifold 606 to output a flow of air 604 to air reservoirs 608 which supply the exhaust apertures 610 along the direction of travel. As a result, as the user 116 pushes the tote 118 along, the air cushion 510 is maintained. Likewise, as the tote 118 moves beyond the exhaust apertures 610, the utility control module 320 may generate utility control data 124 configured to direct the switching manifold 606 to discontinue output of the flow of air 604 to those air reservoirs 608.

It may be advantageous in some scenarios to maintain the tote 118 in a reasonably balanced configuration while being supported by the air cushion 510. In one implementation the utility control modules 320 or 418 may be configured to check that a center of mass of the tote 118 is within a threshold range prior to initiating the air cushion 510. The center of mass of the tote 118 may be determined by measuring the weight of the tote 118 or a portion thereof such as the item stowage area 504 at several points. Based on weight data from a plurality of weight sensors 120(6), a center of mass may be determined. For example, weight sensors 120(6) may be positioned to measure the weight load on one of four feet which support the tote 118 while the tote 118 is unsupported by the air cushion 510. In another example, pressure sensors 120(13) may be configured to measure pressures of the air cushion 510 at different points under the deck 506, and weight may be determined based at least in part on the pressure.

In another implementation, one or more accelerometers 120(10), gyroscopes 120(11), tilt sensors, and so forth may be employed to generate data indicating the tote 118 has exceeded a predetermined threshold tilt value with respect to the utility floor 128. For example, tilt sensors may indicate that the tote 118 is 12° out of level. The activation parameters 336 may be configured to specify that the air cushion 510 is to be disestablished or not otherwise established when the tote 118 is more than 10° out of level.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a utility floor;
a first wireless power unit at or below the utility floor, the first wireless power unit configured to transmit power;
a first aperture configured to emit air at a surface of the utility floor;
a second aperture configured to emit air at the surface of the utility floor;
a sensor to provide position data indicative of a position of a tote over a portion of the utility floor containing one or more of the first aperture or the second aperture;
an air source configured to deliver a flow of air;
a first air reservoir coupled to the air source and coupled to the first aperture, the first air reservoir configured to direct at least a portion of the flow of air received from the air source through the first aperture to the utility floor;
a second air reservoir coupled to the air source and coupled to the second aperture, the second air reservoir configured to direct at least a portion of the flow of air received from the air source through the second aperture to the utility floor;
a switching manifold configured to selectively direct at least a portion of the flow of air from the air source to one or more of the first air reservoir or the second air reservoir; and
a switching manifold controller configured to operate the switching manifold to direct a portion of air from the air source to the one or more of the first air reservoir or the second air reservoir, responsive to the position data, to provide air from apertures beneath at least a portion of the tote.

2. The system of claim 1, further comprising:
an inventory location, the inventory location comprising:
one or more shelves, racks, cases, cabinets, bins, pallets, or tubs configured to contain one or more items; and
a deck configured to be supported by at least a portion of the air emitted from the surface of the utility floor, the deck supporting an item stowage area.

3. The system of claim 1, further comprising:
the tote, the tote comprising:
a frame configured to provide an item stowage area configured to contain one or more items;
a deck coupled to the frame, the deck configured to be supported by at least a portion of the air emitted from the surface of the utility floor;
a skirt comprising a flexible material mounted to a perimeter of the deck and configured to accept and retain a portion of the air emitted from the utility floor to at least partially inflate the skirt;
a second wireless power unit proximate to the deck, the second wireless power unit configured to electromagnetically couple to the first wireless power unit to receive the power; and
one or more electronic devices configured to consume the power received by the second wireless power unit.

4. The system of claim 1, further comprising:
an imaging device configured to acquire image data; and
a computing device comprising:
a communication interface configured to couple to one or more of the tote, the imaging device, or the switching manifold;
a memory storing computer-executable instructions; and
a hardware processor in communication with the communication interface and the memory, wherein the hardware processor is configured to execute the computer-executable instructions to:
access the image data;
determine a position of the tote on the utility floor using the image data;
determine one or more air reservoirs associated with the position of the tote on the utility floor; and
operate the switching manifold to direct a flow of air to one or more apertures corresponding to the one or more air reservoirs that are associated with the position of the tote.

5. A system comprising:
a utility floor;
a first aperture configured to emit air at a surface of the utility floor;
a second aperture configured to emit air at the surface of the utility floor;
a sensor to provide position data indicative of a position of a tote over a portion of the utility floor containing one or more of the first aperture or the second aperture;
an air source configured to deliver a flow of air;
a first air reservoir coupled to the air source and coupled to the first aperture, the first air reservoir configured to direct at least a portion of the flow of air received from the air source through the first aperture to the utility floor;
a second air reservoir coupled to the air source and coupled to the second aperture, the second air reservoir configured to direct at least a portion of the flow of air received from the air source through the second aperture to the utility floor;
a switching manifold configured to selectively direct at least a portion of the flow of air from the air source to one or more of the first air reservoir or the second air reservoir; and a switching manifold controller configured to operate the switching manifold to direct a portion of air from the air source to the one or more of the first air reservoir or the second air reservoir, responsive to the position data, to provide air from apertures beneath at least a portion of the tote.

6. The system of claim 5, further comprising:
an inventory location, the inventory location comprising:
one or more shelves, racks, cases, cabinets, bins, pallets, or tubs configured to contain one or more items; and
a deck configured to be supported by at least a portion of the air emitted from the surface of the utility floor.

7. The system of claim 5, the tote comprising:
an item stowage area configured to contain one or more items; and
a deck supporting the item stowage area, the deck configured to be supported by at least a portion of the air emitted from the surface of the utility floor.

8. The system of claim 7, the tote further comprising one or more of:
a skirt comprising a flexible material mounted to a perimeter of the deck and configured to retain a portion of the air emitted from the surface of the utility floor, or
a plurality of wheels configured to disengage the utility floor while the tote is supported by the air emitted from the surface of the utility floor.

9. The system of claim 7, the tote further comprising:
a power supply configured to provide electrical power to components in the tote, wherein the power supply comprises one or more of:
a photovoltaic cell,
a battery,
a wireless power unit receiver,
a fuel cell, or
a capacitor.

10. The system of claim 5, further comprising:
a first wireless power unit at or below the utility floor, the first wireless power unit configured to transmit power; and
wherein the tote comprises:
a second wireless power unit configured to electromagnetically couple to the first wireless power unit to receive the power; and
one or more electronic devices configured to consume the power received by the second wireless power unit.

11. The system of claim 5, wherein the sensor comprises an imaging sensor configured to acquire image data of at least a portion of a room in which the utility floor is emplaced;
the system further comprising:
an air source controller configured to operate the air source; and
a computing device comprising:
a communication interface configured to communicatively couple to the imaging sensor and the air source controller,
a memory storing computer-executable instructions, and
a hardware processor in communication with the communication interface and the memory, wherein the hardware processor is configured to execute the computer-executable instructions to:
access the image data;
use the image data to determine a user is within a threshold distance of the tote; and
use the air source controller to activate the air source to deliver the flow of air.

12. The system of claim 5, further comprising:
determining, based on a change in the position data over time, movement of the tote toward a second position on the utility floor; and
operating the switching manifold to direct a flow of air to an air reservoir coupled to apertures beneath the second position.

13. The system of claim 5, further comprising one or more environmental control devices, the one or more environmental control devices including one or more of:
an air heating unit,
an air cooling unit, or
an air cleaning unit; and
wherein the air source is configured to provide air to or receive air from the one or more environmental control devices.

14. The system of claim 5, further comprising:
a vacuum system configured to withdraw air from one or more of the first air reservoir or the second air reservoir; and
wherein the switching manifold is configured to selectively direct air between:
the one or more of the first air reservoir or the second air reservoir and the air source, or
the one or more of the first air reservoir or the second air reservoir and the vacuum system.

15. The system of claim 5, wherein the sensor comprises an imaging sensor configured to acquire image data of at least a portion of the utility floor.

16. A system comprising:
a utility floor;
a first aperture configured to emit air at a surface of the utility floor;
a second aperture configured to emit air at the surface of the utility floor;
an air source configured to deliver a flow of air;
a first air reservoir coupled to the air source and coupled to the first aperture, the first air reservoir configured to direct at least a portion of the flow of air received from the air source through the first aperture to the utility floor;
a second air reservoir coupled to the air source and coupled to the second aperture, the second air reservoir configured to direct at least a portion of the flow of air received from the air source through the second aperture to the utility floor;
a switching manifold configured to selectively direct at least a portion of the flow of air from the air source to one or more of the first air reservoir or the second air reservoir; and
a first wireless power unit at or below the utility floor, the first wireless power unit configured to transmit power.

17. The system of claim 16, further comprising:
a sensor configured to provide position data indicative of a position of a tote over a portion of the utility floor containing one or more of the first aperture or the second aperture; and
a switching manifold controller configured to operate the switching manifold to direct a portion of air from the air source to the one or more of the first air reservoir or the second air reservoir, responsive to the position data, to provide air from apertures beneath at least a portion of the tote.

18. The system of claim 16, further comprising:
a tote further comprising:

a second wireless power unit, the second wireless power unit configured to electromagnetically couple to the first wireless power unit to receive the power.

19. The system of claim 18, wherein the tote further comprises:
a frame configured to provide an item stowage area configured to contain one or more items;
a deck coupled to the frame, the deck configured to be supported by at least a portion of the air emitted from the surface of the utility floor;
a skirt comprising a flexible material mounted to a perimeter of the deck and configured to accept and retain a portion of the air emitted from the utility floor to at least partially inflate the skirt; and
one or more electronic devices configured to consume the power received by the second wireless power unit.

20. The system of claim 18, wherein the second wireless power unit receives power from the first wireless power unit when the first wireless power unit is activated to provide power.

* * * * *